United States Patent [19]

Gibson et al.

[11] 4,413,073

[45] Nov. 1, 1983

[54] STABLE AQUEOUS FILM-FORMING DISPERSIONS

[75] Inventors: David V. Gibson, Armadale; Rodney W. Parr, Doncaster; John E. Swalwell, Doncaster East, all of Australia

[73] Assignee: ICI Australia Limited, Melbourne, Australia

[21] Appl. No.: 393,405

[22] Filed: Jun. 29, 1982

[30] Foreign Application Priority Data

Jun. 29, 1981 [AU] Australia .............................. PE9496
Dec. 23, 1981 [AU] Australia .............................. PF2074

[51] Int. Cl.$^3$ ...................... C08L 33/00; C08L 33/12
[52] U.S. Cl. .................................. 523/511; 523/501; 524/457; 524/458; 524/460; 524/461
[58] Field of Search ............... 523/501, 511; 524/457, 524/458, 460, 461

[56] References Cited

U.S. PATENT DOCUMENTS

| 3,620,989 | 11/1971 | Cummings | 525/7.1 |
|---|---|---|---|
| 3,686,114 | 8/1972 | Thompson et al. | 524/461 |
| 3,878,148 | 4/1975 | Gillan et al. | 525/317 |
| 3,981,895 | 9/1976 | Leary et al. | 260/404.8 |
| 4,092,470 | 5/1978 | Oosterwijk et al. | 526/208 |
| 4,151,148 | 4/1979 | Chasin et al. | 523/501 |
| 4,153,770 | 5/1979 | Ogata et al. | 526/328 |
| 4,156,667 | 5/1979 | Turpin | 523/501 |
| 4,229,547 | 10/1980 | Cohen et al. | 526/208 |
| 4,287,329 | 9/1981 | Heimberg | 526/331 |
| 4,296,014 | 10/1981 | Hayashi et al. | 523/501 |
| 4,373,054 | 2/1983 | Gibson et al. | 525/438 |

FOREIGN PATENT DOCUMENTS

| 10424 | 4/1980 | European Pat. Off. . |
|---|---|---|
| 1255527 | 12/1971 | United Kingdom . |
| 1417713 | 12/1975 | United Kingdom . |
| 1421114 | 1/1976 | United Kingdom . |
| 1515713 | 6/1978 | United Kingdom . |
| 2038846 | 7/1980 | United Kingdom . |

Primary Examiner—Ronald W. Griffin
Attorney, Agent, or Firm—Cushman, Darby & Cushman

[57] ABSTRACT

This invention relates to the preparation of stable aqueous dispersions of particles of film-forming polymer, the particles comprising at least one pre-formed polymer and at least one polymer formed in situ ("multi-polymer particles").

The inadequate stability exhibited by many previously known film-forming systems based on multi-polymer particles, especially in the presence of co-solvents, may be overcome by preparing the particles in the presence of a stabilizing compound which is an amphipathic compound with a hydrophilic-lipophilic balance (HLB) value of at least 8 and whose lipophilic portion comprises at least one ethylenic double bond.

The dispersions of this invention are useful as the film-forming components of coating compositions.

14 Claims, No Drawings

STABLE AQUEOUS FILM-FORMING DISPERSIONS

This invention relates to film-forming aqueous dispersions which are useful in such applications as surface coatings, adhesives and polishes.

It has been proposed for some years now that aqueous dispersions of particles of film-forming polymer wherein the individual particles comprise a blend of at least two polymers (hereinafter referred to "multi-polymer particles") can offer advantages over the previously-known dispersions wherein the particles comprise a single polymer. For example, they can form films which exhibit a combination of the advantageous properties of the individual polymers.

An early example of multi-polymer particles can be found in British Pat. No. 1,255,527 which describes heat-vulcanisable acrylate copolymers, the vulcanisability being provided by the inclusion in the polymer of a small proportion (10% by weight maximum) of a polyepoxide compound which may be polymeric. These acrylate copolymers may be prepared in bead form; the method of achieving this is not elaborated upon but conventional surfactants and suspending agents are mentioned in the tabular examples. However, the small quantities of polyepoxide compounds present and their low molecular weights means that they would only have a slight effect on the basically acrylic nature of the polymers. This is not surprising as they are intended solely as cross-linking agents.

An advance on this is shown in British Pat. Nos. 1,417,713 and 1,421,114. These documents describe several ways of preparing convertible multi-polymer particles. By "convertible" we mean that a cured film of the polymer will not dissolve in a solvent which would dissolve the polymer prior to curing; thermosetting and autoxidative resins are thus "convertible" (see "Paint Technology Manuals", Part 3 (1962, Chapman and Hall on behalf of the Oil and Colour Chemists' Association)).

British Pat. No. 1,515,723 describes multi-polymer particles which are stated to comprise homogeneous blends of addition polymer and high molecular weight thermoplastic pre-formed polymer, the patentee having a particular interest in cellulosic polymers. These may be prepared by a method similar to that described above. A weakness in this disclosure is that homogeneous multi-polymer particles may not always be attained as is pointed out in European Published Application No. 0 010 424 which endeavours to correct this weakness. This European Published Application deals particularly with the use of cellulose acetate alkylate as pre-formed polymer. Both disclosures use conventional surfactants.

U.S. Pat. No. 3,620,989 describes a means of preparing an aqueous dispersion of multipolymer particles wherein the individual particles comprise both alkyd resin and addition polymer, in particular addition polymer prepared from vinyl monomers. This invention promises a route to an airdrying, convertible aqueous finish, a goal which has long been pursued by the surface coatings industry. In this case, the alkyd resin and the addition monomer which forms the polymer of the particles are not merely blended but deliberately copolymerised; this is made possible by the use of a special alkyd. resin having ethylenic unsaturation in the polymeric backbone. The dispersions of this invention are formed, for example, by blending at least a major portion of the addition monomer with the alkyd resin, dispersing the mixture in water in the presence of an emulsifier (the choice of which is stated to be not critical and well within the skill of the technician) and initiating polymerisation. This polymerisation has, however, a relatively poor conversion rate. The examples of the specification show a percentage yield of polymer of 85% maximum which means that the compositions according to this invention would contain a high proportion of free monomer. Such a proportion is unacceptable from both toxicological and customer acceptance points of view.

In addition to the various individual shortcomings listed above, we have observed that the known compositions utilising multi-polymer particles have one common shortcoming; inadequate stability. Many of them cannot tolerate the conditions of shear encountered in normal paint manufacturing applications. Others are not stable on storage or application. These deficiencies are accentuated when the final composition contains a "co-solvent," that is, a liquid which is miscible with the continuous phase and which is also compatible with the disperse phase. Co-solvents are useful for modifying the application and film-forming properties of aqueous dispersions of film-forming polymer and are considered essential ingredients of most practical paint systems.

This invention permits the formulation of practical coating systems which utilise multi-polymer particles and which are substantially free from the above-mentioned defects. We therefore provide, according to the present invention, a process of preparing an aqueous dispersion of film-forming polymer wherein pre-formed polymer, unsaturated monomer and water are mixed so as to form a dispersion of particles wherein the individual particles comprise a blend of pre-formed polymer and monomer and are stabilised by the presence of a stabilising compound, and the monomer is polymerised to give an aqueous dispersion of particles wherein each particle comprises a blend of pre-formed polymer and polymer formed in situ from the monomer, characterised in that the stabilising compound is an amphipathic compound with an H.L.B value of at least 8, that portion of the compound which is lipophilic comprising at least one ethylenic double bond.

We have discovered that the combination of an aqueous dispersion of multi-polymer particles and a stabilising compound having the characteristics hereinabove described offers notable advantages over the known multi-polymer particle aqueous dispersions. In many cases, our invention permits for the first time, the preparation of practical paint compositions from a class of binders which has shown considerable promise but which has not lived up to this promise because of practical difficulties as previously described.

The pre-formed polymers which can be used in the working of our invention can be chosen from a wide variety of suitable materials known to the art. In our preferred case, the pre-formed polymer is soluble in or miscible with the monomer but this need not necessarily be so. The pre-formed polymer may comprise a single polymer or it may comprise two or more different polymers. Where the preformed polymer requires the use of an ancillary material in order to achieve a particular end, for example, a cross-linking agent for a thermosettable polymer or a drier for an autoxidisable polymer, this is comprehended by our use of the term "polymer." Such ancillary materials may themselves be polymeric and may therefore comprise part of the pre-formed polymer.

The pre-formed polymer may be a thermoplastic polymer, for example, non-functional acrylics, cellulose acetate butyrate, phthalate plasticizers, bitumen, waxes, styrene-butadiene rubbers, neoprene rubbers, polybutene, diethylene glycol adipate polymeric esters and petroleum resins.

The pre-formed polymer may be a convertible polymer selected, for example, from among the wide range of materials which when activated by heat, catalysis, cross-linking agent or a combination of these factors form an insoluble, tough film. These include acrylics, epoxy resins, phenolic resins, polyester resins and amine-aldehyde resins such as urea- and melamine-formaldehyde resins.

The convertible polymer may also be an autoxidisable polymer, that is, a polymer which on exposure to the air undergoes a cross-linking reaction. It may be, for example, a drying or semidrying triglyceride oil obtained from natural sources such as linseed, safflower, soya and tung oils or a fatty acid derived from such an oil. It can also be a polymer to which autoxidisable fatty chains have been attached, such as alkyd resins which term includes modified alkyds such as styrenated, acrylated and urethane-modified alkyds. Examples of autoxidisable materials containing triglyceride oil-derived fatty chains which can be used in our invention are disclosed in U.S. Pat. Nos. 3,857,871, 3,878,148 and 3,981,895.

The autoxidisable material need not of course be derived from a triglyceride oil and such autoxidisable materials as poly(butadiene), poly(vinyl ethers), vinyl dioxolane and allyloxy group-containing polymers such as poly(allyl glycidyl ether) may be used in our invention.

It is permissible and often desirable to use in our invention pre-formed polymer which can participate in an addition polymerisation. For example, it is recognised that autoxidisable materials such as alkyd resins are able to participate in such reactions, but it can be advantageous to actively promote this by providing ethylenic unsaturation in the polyester backbone chain of the alkyd. Similarly, materials such as unsaturated polyesters may be used.

It is possible to use more than one of each type of pre-formed polymer in a single particle. It is also possible to blend more than one of these types of pre-formed polymer in a single particle. For example, a thermoplastic polymer can be used for plasticising purposes in a particle which also contains a thermosettable polymer.

The pre-formed polymer may be present to the extent of from 2–98%, preferably 20%–80%, by weight of the total weights of the pre-formed polymer and monomer.

The monomer from which the in situ polymer is formed may be selected from one or more of the wide range of $\alpha, \beta$-ethylenically unsaturated monomers known to the art, subject only to the condition that the monomer or mixture of monomers must be water-insoluble by which we mean that it must have a maximum solubility in water of 10% by weight at 25° C. Typical examples of monomers which can be used in our invention are methyl, ethyl, propyl, butyl, allyl, lauryl and stearyl acrylates and methacrylates, styrene, the mixed isomers of methyl styrene known as "vinyl toluene," vinyl chloride and vinyl acetate and di-alkyl maleates. Functional monomers such as hydroxypropyl methacrylate and acrylic and methacrylic acids may also be used.

The stabilising compound must be an amphipathic compound, that is, a compound having both a hydrophilic (solvatable by water) portion and lipophilic (solvatable by oil) portion. It must additionally comply with two requirements;

(a) it must have an H.L.B. value of at least 8, and (b) the lipophilic segments must comprise at least one ethylenic double bond.

The concept of H.L.B (hydrophilic-lipophilic balance) value is one which is well-known to the art and is a widely-used and frequently-quoted parameter in the field of surfactants. We use the term here in a conventional sense, and a person skilled in the art will comprehend what is meant.

The lipophilic portion of the compound must additionally comprise at least one ethylenically unsaturated double bond. This may be integral with the lipophilic portion or it may be added thereto by reaction with a species containing such a double bond. This can occur for example if the species comprising the double bond comprises in addition a reactive group, and the lipophilic portion comprises a group reactable therewith. Examples of compounds which can provide suitable lipophilic moieties are norbornene methanol and cinnamyl alcohol.

We prefer that the lipophilic portion should be one which possesses at least one ethylenic double bond corresponding to the formula

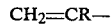

$CH_2=CR-$ where R is hydrogen or a $C_1$–$C_4$ alkyl group. Materials comprising suitable double bonds and which can comprise at least part of a lipophilic portion include allyl alcohol, methallylalcohol, eugenol, undecylenic acid, trimethylolpropane diallylether, pentaerythritol triallyl ether, the reaction product of 1 mole of 2,2-bis(4-hydroxyphenol)propane with 2 moles of allyl glycidyl ether and acrylate and methacrylate group-containing compounds such as a poly(butylene oxide) methacrylate.

By "lipophilic portion," we mean that portion of the stabilising compound which is insoluble in water. It is permissible for the lipophilic portion to comprise components which are per se soluble in water provided that the whole lipophilic portion is insoluble in water. Thus, it is possible, for example, for the species bearing the ethylenic double bond to be connected to the remainder of the lipophilic portion by a short molecular segment which is per se water-soluble.

The hydrophilic portion of the stabilising compound may be provided, for example, by a water-soluble non-ionic species such as a poly(ethylene oxide) chain, the size of such species being determined by the H.L.B. requirement. The hydrophilic portion may also consist of or comprise an ionic species.

The stabilising compound used in the process of our invention is an entity distinct from the preformed polymer and the monomer which is polymerised to form the in situ polymer. It is permissible that the pre-formed polymer, the monomer or both contain water-solvatable groups which can assist in the stabilisation of the final multi-polymer particles, but we have found that in practical paint systems these cannot be the sole source of stabilisation. Our compositions must therefore always comprise a stabilising compound in addition to a preformed polymer and monomer which is polymerised to form an in situ polymer.

It is permissible to use a blend of our stabilising compounds, or to blend our stabilising compounds with conventional ionic or non-ionic surfactants. It is also permissible to use our stabilising compounds in conjunction with suspending agents such poly(vinyl alcohol) or hydroxyethyl cellulose, although we prefer not to use such combinations, as they may degrade the properties of films formed from dispersions according to our invention.

The mode of action of our chosen stabilising compounds is not completely known to us but we believe, without restricting our invention in any way, that the ethylenic double bond participates to some degree in the polymerisation reaction undergone by the monomer and that this co-reaction between stabilising compound and multi-polymer particle results in enhanced stability. However, this appears to be true even of ethylenic double bonds such as allylic double bonds which theoretically should not readily participate in free radical-initiated addition polymerisation reactions. It is an interesting and surprising feature of our invention that some of our most effective stabilising compounds have allylic double bonds.

The stabilising compound is typically present to the extent of from 1-20% by weight of the total weights of the pre-formed polymer and monomer.

The multi-polymer particles of our invention are prepared by mixing pre-formed polymer, monomer and water so as to form a dispersion of particles wherein the individual particles comprise a blend of pre-formed polymer and monomer. This can be done simply by adding the pre-formed polymer and monomer separately to water whilst stirring. However, our preferred method is to blend the preformed polymer with the monomer and then to disperse the blend in water. It is helpful if the pre-formed polymer and the monomer are compatible but this is not important and some of our systems are relatively incompatible. The stabilising compound may be added either to the water or to the pre-formed polymer and/or monomer. A useful variant of these methods is the addition of the preformed polymer and a portion of the monomer to the water and the initiation of polymerisation, the remainder of the monomer being fed into the mixture during the course of the polymerisation.

Free radical addition polymerisation may be initiated by any of the means well known to the art. For example, we can use a free radical initiator such as azobisisobutyronitrile. Alternatively, we can use a redox initiation system and polymerisation can be conveniently initiated at room temperature. The nature of the redox initiation system to be used depends to some extent on the natures of the polymer and monomer but selection of a suitable system is within the knowledge of the art. Typical examples of suitable systems are t-butyl perbenzoate/sodium ascorbate and cumene hydroperoxide/sodium ascorbate.

The initiation systems are preferably oil-soluble systems, and the result will be a suspension (mini-bulk) polymerisation. However, it is also possible to use water-soluble initiation systems. The nature of the polymerisation involved in this case is not completely known to us but we believe without restricting our invention in any way that the pre-formed polymer is transported to the forming multi-polymer particles by monomer which is migrating to micelles formed by the stabilising compound. The cumene hydroperoxide/sodium ascorbate system hereinabove described can be used in this fashion as cumene hydroperoxide is partially soluble in water.

The aqueous dispersions prepared by the process of this invention may be used in a number of applications. They may, for example, be used as the film-forming components of coating compositions. Conventional additives such as pigments, extenders, thickening agents and fungicides may be added in art-recognised quantities. One noteworthy feature of our invention is that we can incorporate a proportion of co-solvent without risking the instability which has previously been so prevalent in this type of composition. Another is that our film-forming binders can usually withstand even quite harsh processing such as ball-milling and sand grinding sometimes necessary for the incorporation of certain pigments.

The invention is further illustrated by the following examples in which all parts are expressed by weight.

EXAMPLE 1

Preparation of an aqueous dispersion of multi-polymer particles wherein the pre-formed polymer is an alkyd resin.

An alkyd resin prepared from soya bean oil, pentaerythritol and phthalic anhydride in the mole ratios of 1.0:1.48:2.51 and of acid value 7 mg.KOH per gm was dissolved in methyl methacrylate monomer to give a solution containing 81.8% by weight of alkyd resin. The following components were then added in order to 20.67 parts of this alkyd/monomer solution;
(a) 21.2 parts methyl methacrylate, 14.4 parts butyl acrylate, 0.27 parts of a 6% solution of zirconium octoate and 0.14 parts of an 8% solution of cobalt aytenate;
(b) 2.8 parts of a stabilising compound prepared from 1 mole pentaerythritol triallyl ether, 2 moles butylene oxide and 35 moles ethylene oxide reacted in that order—this compound was melted and added to the solution.

The resulting solution was added to 9 parts of demineralised water under high speed mixing and the dispersion thus formed was then diluted with 25.3 parts of demineralised water to give an oil-in-water emulsion of particle size 2 $\mu$m maximum.

Polymerisation of the monomer was initiated by the addition of 0.39 parts cumene hydroperoxide followed by a solution of 0.19 parts sodium ascorbate and 0.001 parts ferrous sulphate in 5.6 parts of water. The dispersion exothermed and final product was a white stable dispersion. This dispersion remained stable after the addition thereto of a quantity of butyl "Cellosolve" (trade mark) solvent such that it comprised 20% of the total continuous phase.

EXAMPLE 2

Preparation of an aqueous dispersion of multi-polymer particles wherein the pre-formed polymer is a polyester resin.

A polyester resin prepared from neopentyl glycol, adipic acid, isophthalic acid, terephthalic acid and trimellitic anhydride in the mole ratios of 21.8:8.2:5.8:1:2.2 was dissolved in methyl methacrylate monomer to give a solution containing 79.2% by weight of polyester resin. The following components were then added in order to 29.8 parts of this polyester/monomer solution;

(a) 0.94 parts methyl methacrylate, 6.1 parts butyl acrylate, 4.7 parts hydroxypropyl methacrylate, 0.94 parts methacrylic acid, 4.7 parts styrene and 0.64 parts t-butyl perbenzoate;
(b) 2.8 parts of the stabilising compound described in Example 1.

The resulting solution was then added to 9.7 parts demineralised water under high speed mixing and the dispersion formed was then further diluted with 34.9 parts of demineralised water to give a dispersion of droplets of diameter 0.5 μm maximum. Polymerisation was initiated by adding a solution of 0.27 parts sodium ascorbate in 4.9 parts demineralised water. The dispersion exothermed and the final product was a white stable dispersion. The dispersion remained stable after the addition thereto of a quantity of butyl "Cellosolve" solvent such that it comprised 20% by weight of the total continuous phase.

EXAMPLE 3

This example demonstrates the importance of having ethylenic double bonds on the stabilising compound.

The stabilising compounds used in this example were as follows:
(A) a nonyl phenyl ethoxylate having about 40 moles of ethylene oxide (A commercially-available material called "Teric" N40 (trade mark) was used).
(B) the reaction product of one mole of pentaerythritol triallyl ether with 2 moles of butylene oxide and 25 moles of ethylene oxide reacted in that order;
(C) as (B) but with 50 moles of ethylene oxide;
(D) as (B) but with 35 moles of ethylene oxide and the double bonds of the pentaerythritol triallyl ether removed by hydrogenation;
(E) the reaction product of one mole of 2,2'-bis(4-hydroxyphenol)propane with 16 moles of propylene oxide and 54 moles of ethylene oxide;
(F) the reaction product of one mole of 2,2'-bis-hydroxyphenylpropane with two moles of allyl glycidyl ether and 36 moles of ethylene oxide;

The preparation of Example 1 was repeated using these stabilising compounds. The resulting dispersions were then tested for stability by adding butyl "Cellosolve" solvent until it constituted 20% by weight of the total continuous phase. The results are shown in the following table.

| pre-formed polymer | stabilizing compound | stability in the presence of solvent |
| --- | --- | --- |
| alkyd resin | A | unstable |
| alkyd resin | B | stable |
| alkyd resin | C | stable |
| alkyd resin | D | unstable |
| alkyd resin | E | unstable |
| alkyd resin | F | stable |

The results show that only those dispersions prepared in the presence of stabilising compounds having a double bond were stable in the presence of the solvent. This is an important distinction as butyl "Cellosolve" solvent and similar solvents are widely used in the surface coatings industry as co-solvents.

EXAMPLE 4

Preparation of an aqueous dispersion wherein the pre-formed polymer is an epoxy resin and the stabilising compound is cationic.

18.1 parts of "Epikote" 828 epoxy resin, 11.0 parts of methyl methacrylate and 7.0 parts of butyl acrylate were mixed. The resulting mixture was added to an aqueous solution of 2.9 parts of demineralized water and 1.8 parts of the acetate salt of N-(N',N'-dimethylaminoethyl)-10-undecenamide (stabilising compound) under high speed mixing. The dispersion thus formed was then diluted with 52.9 parts of water to give an oil-in-water emulsion of 3 μm maximum particle size.

Polymerisation of the monomer was initiated by the addition of 0.30 parts of cumene hydroperoxide followed by a solution of 0.15 parts of sodium erythorbate and 0.001 parts of ferrous sulphate in 5.8 parts of water. The dispersion exothermed and the final product was a white stable dispersion.

This dispersion remained stable after the addition thereto of a quantity of butyl "Cellosolve" solvent such that it comprised 20% of the total continuous phase.

EXAMPLE 5

This example illustrates the use of a non-ionic and an anionic stabilising compound according to the invention.

The procedure of Example 4 was repeated twice, substituting the aqueous solution of stabilising compound by
(a) in the first case, a solution in 2.9 parts water of 1.8 parts of a stabilising compound prepared from one mole of undecylenic acid and 35 moles of ethylene oxide; and
(b) in the second case, a solution in 5.5 parts of water of 1.8 parts of the dimethylaminoethanol salt of undecylenic acid.

The resulting emulsions were diluted with 52.9 and 50.3 parts of water respectively and polymerised.

Both dispersions remained stable to the addition of butyl "Cellosolve" solvent as in example 1.

EXAMPLE 6

Preparation of an aqueous dispersion of multipolymer particles wherein the pre-formed polymer is a polyester comprising allyloxy groups.

The following materials and quantities were used;

| polyester[1] | 17.4 parts | A |
| --- | --- | --- |
| methyl methacrylate | 25.5 | |
| butyl acrylate | 14.5 | |
| stabilizing compound[2] | 2.9 | |
| drier solution[3] | 0.7 | |
| azo-bis-isobutyronitrile | 0.2 | B |
| demineralized water | 9.1 | C |
| demineralized water | 29.7 | D |

[1]A polyester resin prepared from allyl glycidyl ether, adipic acid and isophthalic acid in the mole ratios of 1.4:0.5:0.5 and used as a 98.6% weight solids in solution in toluene.
[2]Stabilizing compound as described in Example 1
[3]8% solution of cobalt aytenate.

The materials A were mixed and warmed to dissolve the stabilising compound. A was then cooled to room temperature and B was added. When B was dissolved the mixture was added to C under high speed mixing and diluted with D. The dispersion had a maximum particle diameter of 1.5 μm.

Polymerisation was carried out by heating the dispersion to 60° C. for 4 hours and to 80° C. for a further 2 hours, the dispersion being stirred continuously to dissipate the heat evolved.

The final product was a white stable dispersion which remained stable to the addition of a quantity of butyl "Cellosolve" solvent such that it comprised 20% by weight of the total continuous phase.

EXAMPLE 7

Preparation of an aqueous dispersion of multipolymer particles wherein the pre-formed polymer is acrylic.

A solution in xylene of an acrylic resin prepared from butyl methacrylate, methyl methacrylate, styrene, butyl acrylate, hydroxy propyl acrylate, methacrylic acid and xylene in the ratio 12.84:14.44:21.08:22.86:15.37:1.46:11.95 was dissolved in methyl methacrylate and styrene to give a solution of 88.0% resin, 6.0% methyl methacrylate and 6.0% styrene.

The following components were then added in order to 35.4 parts of this acrylic resin/monomer solution;

(a) 2.3 parts butyl methacrylate, 0.5 parts methyl methacrylate, 3.9 parts styrene, 2.0 parts butyl acrylate, 2.8 parts hydroxypropyl acrylate, 0.3 parts methacrylic acid and 0.48 parts cumene hydroperoxide.

(b) 4.9 parts of a stabilising compound prepared from 1 mole of pentaerythritol triallyl ether, 4 moles of butylene oxide and 35 moles of ethylene oxide reacted in that order. This compound was dissolved in (a) by warming the mixture.

The resulting solution was then added to 10.6 parts of demineralised water under high speed mixing and the dispersion formed was then further diluted with 32.9 parts of demineralised water to give a dispersion of droplets of diameter 1.0 $\mu$m maximum. Polymerisation was initiated by adding a solution of 0.28 parts of sodium ascorbate in 2.9 parts of demineralised water and catalysed with a solution of a trace of ferrous sulphate in 0.87 parts of demineralized water. This dispersion exothermed and the final product was a white stable dispersion. This dispersion remained stable after the addition thereto of a quantity of butyl "Cellosolve" solvent such that it comprised 20% by weight of the total continuous phase.

EXAMPLE 8

Preparation of an aqueous dispersion of multipolymer particles wherein the pre-formed polymer is a polyester. The polyester comprises 5% by weight of the combined weights of pre-formed polymer and monomer.

45.5 parts of a polyester (adipic acid, diethylene glycol and benzyl alcohol in the mole ratio of 2:1:2.8, used as a 98.2% weight solids solution in toluene) was mixed with 495.9 parts of methyl methacrylate, 318.4 parts of butyl acrylate and 42.9 parts of the stabilising compound of Example 1 and the mixture warmed in order to obtain a homogeneous solution. The mixture was then cooled to ambient temperature and 16.3 parts of azobisisobutyronitrile was added. The mixture was emulsified into 136.9 parts of demineralised water with high speed stirring and this emulsion was diluted with a further 444.1 parts of demineralised water. Polymerisation was initiated by heating; the emulsion was initially heated for 2 hours at about 50° C. and then at 65°–70° C. for a further 3 hours. The resulting product was a white stable dispersion which remained stable after the addition thereto of butyl "Cellosolve" solvent such that it comprised 20% by weight of the total continuous phase.

EXAMPLE 9

Preparation of an aqueous dispersion of multipolymer particles wherein the pre-formed polymer is an alkyd resin. The alkyd resin comprises 70% by weight of the total weight of pre-formed polymer and monomer.

The following materials and quantities were used;

| | | | |
|---|---|---|---|
| alkyd/methyl methacrylate solution[1] | 49.61 | parts | A |
| methyl methacrylate | 0.96 | | |
| butyl acrylate | 6.12 | | |
| stabilizing compound[2] | 2.83 | | |
| drier solution[3] | 0.27 | | |
| drier solution[4] | 0.14 | | |
| cumene hydroperoxide | 0.34 | | |
| demineralized water | 10.20 | | B |
| demineralized water | 25.62 | | C |
| demineralized water | 3.74 | | D |
| sodium ascorbate | 0.17 | | |
| ferrous sulphate | trace | | |
| | 100.00 | | |

[1] 81.8% weight solution of the alkyd resin described in Example 1 in methyl methacrylate.
[2] stabilizing compound described in Example 1.
[3] 6% solution of zirconium octoate
[4] 8% solution of cobalt aytenate The materials A were mixed and warmed to dissolve the stabilising compound. This solution was then added to B under high speed mixing and diluted with C. Polymerization was then initiated with solution D. The dispersion exothermed and gave a white stable dispersion of 2 $\mu$m maximum particle diameter. The dispersion remained stable to the addition of a quantity of butyl cellosolve such than the solvent comprised 20% of the total continuous phase.

EXAMPLE 10

Preparation of an aqueous dispersion of multipolymer particles wherein the pre-formed polymer is a polyester resin.

The following materials and quantities were used;

| | | | |
|---|---|---|---|
| polyester[1] | 54.69 | parts | A |
| methyl methacrylate | 5.74 | | |
| stabilizing compound[2] | 2.84 | | |
| demineralized water | 9.18 | | B |
| demineralized water | 24.72 | | C |
| cumene hydroperoxide | 0.06 | | D |
| sodium ascorbate | 0.03 | | E |
| ferrous sulphate | trace | | |
| demineralized water | 2.74 | | |

[1] Polyester as described in Example 8.
[2] Stabilizing compound as described in Example 1.

The materials A were mixed and warmed to dissolve the stabilising compound. This solution was then added to B under high speed mixing and diluted with C. D was added and stirred for a few minutes before adding solution E. The dispersion exothermed and gave a white stable dispersion of 4 $\mu$m maximum particle diameter. The dispersion remained stable to the addition of a quantity of butyl "Cellosolve" such that the solvent comprised 20% of the total continuous phase.

EXAMPLE 11

Preparation of an aqueous dispersion of multipolymer particles using various levels of stabilising compound.

Example 1 was repeated twice with different quantities of stabilising compound being used on each occasion. One dispersion comprised 2% by weight of stabilising compound, the other 15% by weight, the proportion being calculated on the combined weights of the pre-formed polymer and monomer. (Example 1 contained 5% by weight of stabilising compound).

In each case, the result was a stable white aqueous dispersion which was stable to an addition of butyl "Cellosolve" solvent such that it comprised 20% of the total continuous phase. The particle size of the multipolymer particles was different in each case, the 15% case having a maximum particle size of less than 1 μm and the 2% case a maximum particle size of about 5 μm.

EXAMPLE 12

Preparation of an aqueous dispersion of multipolymer particles using a stabilising compound comprising a methacrylate double bond.

The following materials and quantities were used;

| | | |
|---|---|---|
| linseed oil alkyd resin[1] | 20.83 parts | A |
| methyl methacrylate | 11.73 | |
| styrene | 5.55 | |
| butyl acrylate | 13.54 | |
| n-butoxy methylacrylamide solution[2] | 2.77 | |
| methacrylic acid | 1.11 | |
| stabilizing compound[3] | 2.77 | |
| 6% zirconium octoate solution | 0.30 | |
| 8% cobalt aytenate solution | 0.15 | |
| 1,10-phenanthroline | 0.07 | |
| cumene hydroperoxide | 0.81 | |
| demineralized water | 8.88 | B |
| demineralized water | 23.31 | C |
| demineralized water | 7.71 | D |
| sodium ascorbate | 0.41 | |
| ferrous sulphate | trace | |

[1]97.9% by weight solution in xylene of an alkyd resin made from linseed oil fatty acid, ethylene, glycol, pentaerythritol and phthalic anhydride in the mole ratios of 1.29:0.43:0.64:1.08.
[2]61.2% by weight solution of n-butoxy methylacryl-amide in a 49.1 (weight) mixture of butanol and xylene.
[3]reaction product of methanol, ethylene oxide, butylene oxide and methacrylic acid in the mole ratios of 1:40:10:1 reacted in that order.

The materials A were blended and warmed to dissolve all the components. The mixture was then added to the water B under high speed stirring and the resulting dispersion diluted with C. Polymerisation was initiated by the addition of D. The dispersion exothermed and the final product was a white stable dispersion which remained stable after the addition thereto of a quantity of butyl "Cellosolve" solvent such that it comprised 20% of the total continuous phase.

EXAMPLE 13

Examples of the use of various ethylenic double bonds.

Example 1 was repeated four times replacing the stabilising compound of that example with an equal weight of one of the following compounds;

(a) reaction product of eugenol, butylene oxide and ethylene oxide in the mole ratios 1:2:36; the compounds being reacted in that order;

(b) reaction product of cinnamyl alcohol, butylene oxide and ethylene oxide in the mole ratios 1:3:35; the compounds being reacted in that order;

(c) reaction product of norbornene methanol, butylene oxide and ethylene oxide in the mole ratios 1:5:40 reacted in that order; and (d) reaction product of allyl alcohol, ethylene oxide and butylene oxide in the mole ratios of 1:70:10 reacted in that order.

(a), (b) and (c) are stabilising compounds according to our invention whereas (d), wherein the double bond is not on the lipophilic portion, is not.

All four preparations gave white stable dispersions but when tested for co-solvent stability by the addition thereto of butyl "Cellosolve" solvent to the extent of 20% of the continuous phase, the aqueous dispersion containing (d) became unstable and flocculated. The other three dispersions remained stable.

EXAMPLE 14

Preparation of an aqueous dispersion of multipolymer particles wherein the particles comprise more than one pre-formed polymer.

The materials and quantities used were as follows;

| | | |
|---|---|---|
| phenolic resin[1] | 1.81 parts | A |
| toluene | 3.6 | |
| butyl acrylate | 10.5 | |
| butyl acrylate | 13.4 | B |
| polybutadiene solution | 5.0 | |
| stabilizing compound[3] | 3.2 | |
| cumene hydroperoxide | 0.5 | C |
| demineralized water | 9.1 | D |
| ascorbic acid | 0.2 | E |
| ferrous sulphate | trace | |
| demineralized water | 36.4 | |

[1]modified Phenolic Resin PG600 (ex Monsanto Ltd.)
[2]Polybutadiene Resin G2000 (ex Nippon Soda Ltd.) heated at 200° C. until the onset of gelation and then diluted with toluene to a 63% (weight) solution.
[3]stabilizing compound as used in Example 1.

The materials B were mixed and warmed to dissolve the stabilising compound and then added to the materials A and mixed. C was added to blend of A and B and the mixture was then emulsified in D. The emulsion was diluted and initiated with E. The result was a stable white dispersion.

EXAMPLE 15

Example of a feed process for preparing aqueous dispersions according to the invention.

The materials and quantities used were as follows;

| | | |
|---|---|---|
| demineralized water | 46.0 parts | A |
| stabilizing compound[1] | 4.6 | B |
| polyester resin[2] | 4.4 | |
| methyl methacrylate | 22.0 | C |
| ethyl hexyl acrylate | 17.3 | |
| methacrylic acid | 0.4 | |
| surfactant[3] | 0.2 | |
| surfactant[4] | 1.8 | |
| demineralized water | 3.1 | D |
| ammonium persulphate | 0.1 | |
| sodium tetraborate | 0.1 | |

[1]reaction product of undecylenic acid and ethylene oxide in the mole ratio of 1:35.
[2]reaction product of allyl glycidyl ether, diethylene glycol and adipic acid in the mole ratios of 1.0:0.5:1.0.
[3]a commercially-available 75% solution in water and a "Aerosol" (trade mark) OT (ex American Cyanamid Co.)
[4]"Ethylan" (trade mark) A4 (ex ICI Australia Ltd.)

B was mixed and warmed to dissolve the stabilising compound and then mixed with C. A was heated to 85° C. and the mixtue of B and C added simultaneously with 83% of D over a period of 2 hours. The remainder of D was then added and the temperature held at 85° C. for a further 30 minutes. The mixture was cooled and filtered.

The result was a fine particle size emulsion which an addition of cobalt acetate gave an autoxidisable composition.

EXAMPLE 16

Preparation of a coating composition using an aqueous dispersion according to the invention as the film-forming constituent.

(a) Preparation of aqueous dispersion
The following materials and quantities were used;

| polyester resin solution[1] | 21.86 parts | A |
|---|---|---|
| methyl methacrylate | 2.15 | |
| butyl acrylate | 2.59 | |
| styrene | 3.50 | |
| hydroxypropyl methacrylate | 3.50 | |
| acrylic acid | 1.40 | |
| stabilizing compound[2] | 1.75 | |
| cumene hydroperoxide | 0.35 | |
| demineralized water | 6.30 | B |
| demineralized water | 46.4 | C |
| sodium ascorbate | 0.20 | D |
| demineralized water | 10.00 | |

[1] an 80.5% solution in monomer (methyl methacrylate/butyl acrylate mixture in a weight ratio of 1:1) of a polyester resin prepared from neopentyl glycol, adipic acid, isophthalic acid, terephthalic acid and trimellitic anhydride in the mole ratios of 3.41:1.30:0.91:0.16:0.35
[2] stabilizing compound from Example 1.

A was mixed and warmed to dissolve the stabilising compound. A was then emulsified in B under high speed mixing, the resulting emulsion diluted with C and polymerisation initiated by the addition of D. The result was a stable white dispersion.

(b) Preparation of coating composition
The following materials and quantities were used;

| aluminium pigment[3] | 6.64 | E |
|---|---|---|
| butyl "Cellosolve" solvent | 3.92 | |
| melamine-formaldehyde resin[4] | 4.81 | |
| aqueous dispersion (prepared above) | 50.88 | F |
| demineralized water | 24.68 | |
| butyl "Cellosolve" solvent | 8.40 | |
| 10% solution in water of p-toluenesulphonic acid | 0.67 | G |

[3] Aluminium Paste No. Z26 (ex Aluminium Co. of America) at 65.5% weight solids in hydrocarbon solvent.
[4] "Beetle" (trade mark) 370 (ex British Industrial Plastics Ltd.)

A was mixed and stirred until the pigment was dispersed. B was then mixed and added to A and the pH was adjusted to 7.2 using dimethylaminoethanol. C was added to this mixture and the pH re-adjusted to 7.2.

This gave a paint composition useful as the basecoat in a "basecoat-clearcoat" automotive finish. When sprayed on to primed metal panels, sprayed with a clear finish and baked at 150° C. for 30 minutes, it gave a coating film of good appearance.

EXAMPLE 17

Preparation of a coating composition using an aqueous dispersion according to the invention.
The following materials and quantities were used;

| water | 9.09 parts | A |
|---|---|---|
| sodium hexamethaphosphate | 0.09 | |
| 0.880 ammonia solution | 0.03 | |
| surfactant ("Teric" (trade mark) X11 ex ICI Australia Ltd.) | 1.01 | |
| surfactant ("Teric" 164 ex ICI Australia Ltd.) | 0.51 | |
| antifoam ("Bevaloid" trade mark) 691 ex Bevaloid Australia Pty.Ltd) | 0.25 | |
| surfactant[1] | 1.92 | |
| titanium dioxide | 35.33 | B |
| calcium carbonate | 2.42 | |
| propylene glycol | 4.71 | C |
| fungicide ("Proxel" (trade mark) PL ex ICI Australia Ltd.) | 0.05 | |
| aqueous dispersion from Example 6 | 40.37 | |
| antifoam ("Bevaloid" 691) | 0.11 | D |
| propylene glycol | 2.39 | E |
| tri-n-butyl phosphate | 2.01 | |
| hydroxypropyl methyl cellulose | 0.11 | |

[1] A 35% by weight solution of a styrene-maleic anhydride copolymer in a blend of water, ammonia, ethyl acetate and butyl "Cellosolve" solvent.

The materials B were mixed and the pigment added to A with stirring. Stirring was continued at high speed until the pigment was completely dispersed. The materials in C were then mixed and added to A and B. D was then added under stirring. The resulting mixture was then stirred for 30 minutes.

The paint composition thus prepared brushed out easily and air dried to give a film with a semi-gloss or "satin" appearance. This paint had the advantage of being water-borne and it dried to give a film of good appearance.

EXAMPLE 18

Preparation of a clear coating composition using an aqueous dispersion according to the invention.
The following materials and quantities were used;

| aqueous dispersion from Example 7 | 116.5 parts | A |
|---|---|---|
| demineralized water | 11.3 | |
| melamine-formaldehyde resin ("Beetle" 370 ex British Industrial Plastics Ltd.) | 40.5 | B |
| demineralized water | 30.0 | |
| catalyst soltuion[1] | 4.1 | C |

[1] 10% by weight solution of p-toluenesulphonic acid in water.

The resin solution B was added to the dispersion A and then C was added to this mixture. The final mixture was sprayed onto panels and baked for 30 minutes at 150° C. to give clear glossy films.

We claim:
1. A process of preparing an aqueous dispersion of film-forming polymer wherein pre-formed polymer, unsaturated monomer and water are mixed so as to form a dispersion of particles wherein the individual particles comprise a blend of pre-formed polymer and monomer and are stabilized by the presence of a stabilizing compound, and the monomer is polymerized to give an aqueous dispersion of particles wherein each particle comprises a blend of pre-formed polymer and polymer formed in situ from the monomer, characterized in that the stabilizing compound is an amphipathic compound with an H.L.B. value of at least 8, that portion of the compound which is lipophilic comprising at least one ethylenic double bond.

2. A process according to claim 1, characterised in that the lipophilic portion comprises an entity selected from cinnamyl alcohol and norborene methanol.

3. A process according to claim 1, characterised in that the lipophilic portion of the stabilising compound comprises at least one ethylenic double bond of the formula $CH_2=CR-$ where R is selected from hydrogen and a $C_1$-$C_4$ alkyl group.

4. A process according to claim 1, characterised in that at least one double bond is derived from an entity selected from the group consisting of an acrylate and a methacrylate.

5. A process according to claim 1, characterised in that at least one ethylenic double bond is allylic.

6. A process according to claim 5, characterised in that at least one double bond is derived from a compound selected from the group consisting of allyl alcohol, methallyl alcohol, pentaerythritol triallyl ether, trimethylolpropane diallyl ether, undecylenic acid, eugenol and the reaction product of 1 mole of 2,2-bis(4-hydroxyphenol)propane with two moles of allyl glycidyl ether.

7. A process according to claim 1, characterised in that at least one pre-formed polymer is thermoplastic.

8. A process according to claim 1, characterised in that at least one pre-formed polymer is convertible.

9. A process according to claim 8, characterised in that at least one pre-formed polymer is autoxidisable.

10. A process according to claim 9, characterised in that at least one pre-formed polymer comprises allyloxy groups.

11. A process according to claim 1, characterised in that the pre-formed polymer comprises from 2–98% by weight of the combined weights of pre-formed polymer and unsaturated monomer.

12. A process according to claim 10, characterised in that the pre-formed polymer comprises from 20–80% by weight of the combined weights of pre-formed polymer and unsaturated monomer.

13. A process according to claim 1, characterised in that the stabilising compound is present to the extent of from 1–20% by weight of the combined weights of pre-formed polymer and monomer.

14. An aqueous dispersion of film-forming polymer wherein the disperse particles of polymer comprise a blend of pre-formed polymer and polymer formed in situ, and are stabilised by the presence of a stabilising compound, prepared by mixing pre-formed polymer, unsaturated monomer, stabilising compound and water to give an aqueous dispersion of particles of a blend of pre-formed polymer and monomer, and polymerising the monomer, characterised in that the stabilising compound has a hydrophilic-lipophilic balance (HLB value) of at least 8, that portion of the compound which is lipophilic comprising at least one ethylenic double bond.

* * * * *

UNITED STATES PATENT OFFICE
CERTIFICATE OF CORRECTION

Patent No. 4,413,073　　　　　　　　　Dated November 1, 1983

Inventor(s) David V. Gibson et al

It is certified that error appears in the above-identified patent and that said Letters Patent are hereby corrected as shown below:

The Assignee (item 73) to read --Dulux Australia LTD.--

Signed and Sealed this

Twenty-eighth Day of February 1984

[SEAL]

Attest:

GERALD J. MOSSINGHOFF

*Attesting Officer*　　　　*Commissioner of Patents and Trademarks*